United States Patent
Abbeloos

(10) Patent No.: US 11,967,131 B2
(45) Date of Patent: Apr. 23, 2024

(54) SYSTEM FOR PROCESSING AN IMAGE, METHOD FOR PROCESSING THE IMAGE, METHOD FOR TRAINING A NEURAL NETWORK FOR PROCESSING THE IMAGE, AND RECORDING MEDIUM FOR EXECUTING THE METHOD

(71) Applicant: TOYOTA JIDOSHA KABUSHIKI KAISHA, Toyota (JP)

(72) Inventor: Wim Abbeloos, Hove (BE)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 602 days.

(21) Appl. No.: 17/206,559

(22) Filed: Mar. 19, 2021

(65) Prior Publication Data
US 2021/0295561 A1 Sep. 23, 2021

(30) Foreign Application Priority Data
Mar. 23, 2020 (EP) .................................. 20165022

(51) Int. Cl.
*G06V 10/764* (2022.01)
*G06N 3/08* (2023.01)
(Continued)

(52) U.S. Cl.
CPC ............. *G06V 10/764* (2022.01); *G06N 3/08* (2013.01); *G06T 7/70* (2017.01); *G06T 7/80* (2017.01);
(Continued)

(58) Field of Classification Search
CPC ...... G06V 10/764; G06V 10/82; G06V 20/56; G06V 20/20; G06V 2201/10; G06V 2201/11; G06N 3/08; G06T 7/70; G06T 7/80; G06T 2207/20081; G06T 2207/20084; G06T 2207/30244; G06T 2207/10004
See application file for complete search history.

(56) References Cited

U.S. PATENT DOCUMENTS 11,380,108 B1 * 7/2022 Cai ..................... G06N 20/00
2018/0234671 A1 * 8/2018 Yang ................... G06V 10/82
(Continued)

OTHER PUBLICATIONS

Facil et al., "CAM-Convs: Camera-Aware Multi-Scale Convolutions for Single-View Depth," 2019 IEEE/CVF Conference on Computer Vision and Pattern Recognition (CVPR), IEEE, Jun. 15, 2019, pp. 11818-11827.
(Continued)

*Primary Examiner* — Molly Wilburn
(74) *Attorney, Agent, or Firm* — Dickinson Wright, PLLC

(57) ABSTRACT

The disclosure relates to system for processing an image of at least one camera. The camera has predetermined camera parameters including a lens distortion and a camera pose with respect to a predefined reference frame. The system comprises:
- a trained neural network with a predefined architecture, the neural network being configured to receive the image of the camera as input and to predict in response at least one characteristic, wherein
- the neural network architecture comprises at least one static feature map configured to encode the predetermined camera parameters including the lens distortion and/or the camera pose.

11 Claims, 2 Drawing Sheets

(51) Int. Cl.
 *G06T 7/70*  (2017.01)
 *G06T 7/80*  (2017.01)
 *G06V 10/82* (2022.01)
 *G06V 20/20* (2022.01)
 *G06V 20/56* (2022.01)

(52) U.S. Cl.
 CPC .............. *G06V 10/82* (2022.01); *G06V 20/56* (2022.01); *G06T 2207/20081* (2013.01); *G06T 2207/20084* (2013.01); *G06T 2207/30244* (2013.01); *G06V 20/20* (2022.01)

(56) References Cited

U.S. PATENT DOCUMENTS

2020/0302176 A1\* 9/2020 Yang ..................... G06F 7/57
2021/0287430 A1\* 9/2021 Li ........................ G06V 10/776

OTHER PUBLICATIONS

Kang et al., "Incorporating Side Information by Adaptive Convolution," International Journal of Computer Vision., Dec. 8, 2017, pp. 3867-3877.

Hu et al., "RGB-D Semantic Segmentation: A Review," 2018 IEEE International Conference on Multimedia & Expo Workshops (ICMEW), IEEE, Jul. 23, 2018, pp. 1-6.

Iu et al., "An Intriguing Failing of Convolutional Neural Networks and the CoordConv Solution," Advances in Neural Information Processing Systems, 2018, pp. 9605-9616.

Facil et al., "CAM-Convs: Camera-Aware Multi-Scale Convolutions for Single-View Depth," Proceedings of the IEEE Conference on Computer Vision and Pattern Recognition, 2019, pp. 11826-11835.

Islam et al., "How Much Position Information Do Convolutional Neural Networks Encode?" arXiv preprint arXiv:2001.08248 (2020).

Mallon et al., "Precise Radial Un-distortion of Images," Proceedings of the 17th International Conference on Pattern Recognition, 2004, ICPR 2004, vol. 1, IEEE, 2004, pp. 18-21.

\* cited by examiner

[Fig. 1]
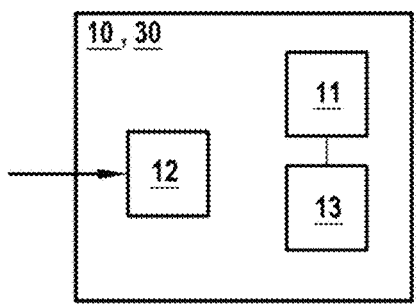
[Fig. 2]
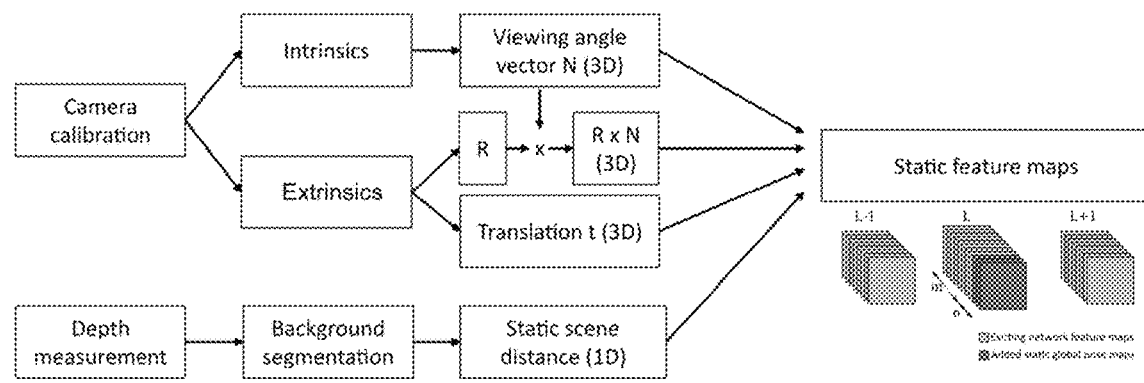
[Fig. 3]
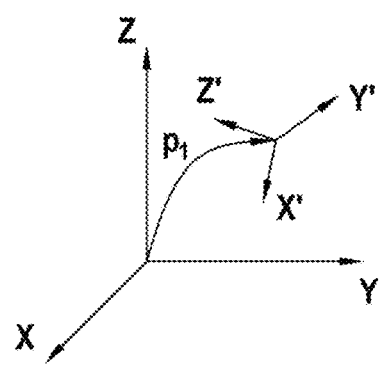

[Fig. 4]
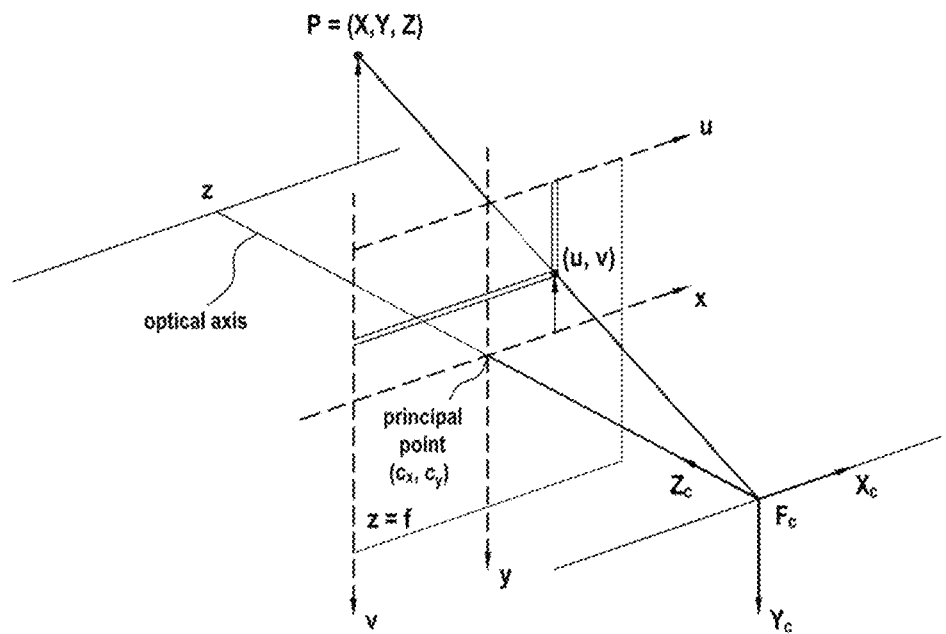
[Fig. 5]
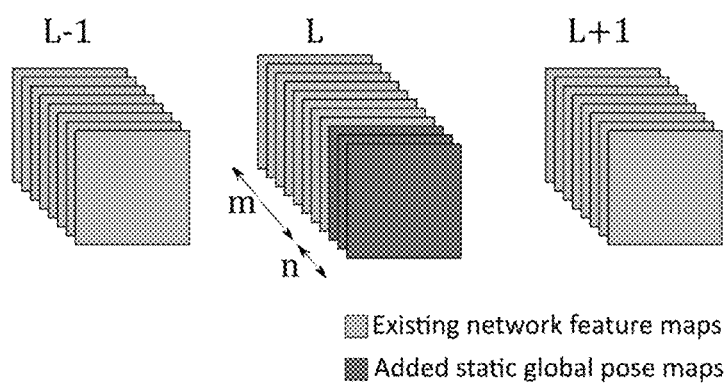

SYSTEM FOR PROCESSING AN IMAGE, METHOD FOR PROCESSING THE IMAGE, METHOD FOR TRAINING A NEURAL NETWORK FOR PROCESSING THE IMAGE, AND RECORDING MEDIUM FOR EXECUTING THE METHOD

CROSS-REFERENCE TO RELATED APPLICATION

This application claims priority to European Patent Application No. 20165022.3 filed on Mar. 23, 2020, incorporated herein by reference in its entirety.

BACKGROUND

1. Field of the Disclosure

The present disclosure is related to the field of image processing, in particular to a system for processing an image, said system having a neural network. The present disclosure is also related to methods for processing the image, methods for training the neural network, and recording mediums for executing the methods.

2. Description of the Related Art

Processing images may be used to detect various objects visible on the image. Such processing is therefore particularly useful for autonomous vehicles (partially or fully self-driving) and for other types of automated systems, because these systems have to be able to understand their surroundings on the basis of images acquired by cameras.

Autonomous vehicles and other robotic platforms require a rich, succinct and detailed representation of their environment which captures both the geometry and layout of the static world as well as the pose and dimensions of other dynamic agents. Such representations often provide the foundation for all decision making, including path planning, collision avoidance and navigation.

In this context, it has become common to use neural networks, e.g. convolutional neural networks for processing images, in order to produce representations.

However, it has been noted that convolutional neural networks may not encode spatial information well, due to the fact they use only local filters, and have limited spatial extent (receptive field), cf. e.g.:

Liu, R., Lehman, J., Molino, P., Such, F. P., Frank, E., Sergeev, A., Yosinski, J.: An intriguing failing of convolutional neural networks and the coordconv solution. In: Advances in Neural Information Processing Systems. (2018) 9605-9616, Facil, J. M., Ummenhofer, B., Zhou, H., Montesano, L., Brox, T., Civera, J.: Camconvs: camera-aware multi-scale convolutions for single-view depth. In: Proceedings of the IEEE conference on computer vision and pattern recognition. (2019) 11826-11835

Islam, M. A., Jia, S., Bruce, N. D.: How much position information do convolutional neural networks encode? arXiv preprint arXiv:2001.08248 (2020)

Spatial information may be useful though in solving many tasks.

Beside this challenge it has been noted that neural networks don't generalize well to new viewpoints. Furthermore it has been noted that neural networks don't generalize well to different cameras (different resolution, focal length, distortion, . . . ).

While using feature maps encoding pixel absolute position to solve the lack of spatial information (cf. Liu et al, as cited above) has been proposed, they simply use image coordinates, not solving any of the other above-mentioned problems.

SUMMARY OF THE DISCLOSURE

Currently, it remains desirable to provide a system and a method for processing an image which overcomes one or more deficiencies of the prior art. In particular, it remains desirable to thereby provide a system comprising a neural network that is able to encode spatial information more effectively, more in particular that the system is able to generalize well to new viewpoints comprising generalizing well to different cameras.

Therefore, according to the embodiments of the present disclosure, a system for processing an image of at least one camera is provided. The camera has predetermined camera parameters including a lens distortion and a camera pose with respect to a predefined reference frame. The system comprises: a trained neural network with a predefined architecture, the neural network being configured to receive the image of the camera as input and to predict in response at least one characteristic, wherein the architecture of the neural network comprises at least one static feature map configured to encode the predetermined camera parameters including the lens distortion and/or the camera pose.

In other words, it is proposed to explicitly encode spatial information into the neural network. This may be done by adding static features maps encoding the camera intrinsic parameters and viewpoint. The term 'static' is used to indicate they are fixed parameters, not affected by (re) training the network.

The intrinsic parameters may be represented by maps containing each pixels' viewing angle with respect to the camera viewing direction.

By providing such a system, it becomes possible to take into account all intrinsic camera parameters for a generic camera (specifically, lens distortion may be modelled instead of assuming a pinhole model). Additionally, it is proposed using the feature maps to encode 'global camera pose' taking into account both intrinsic and extrinsic camera parameters. The goal is to not only generalize to other cameras, but also to other viewpoints.

While Islam et al (cited above) illustrates that some positional information may be encoded in convolutional neural networks, it shows that the information is imperfect. Additionally, the strength of the information strongly depends on the network architecture.

The camera pose may be defined by camera rotation and/or camera translation with respect to the reference frame.

The predetermined camera parameters may comprise optical camera parameters.

The camera may comprise a lens which defines the lens distortion.

The architecture of the neural network may comprise at least one first static feature map configured to encode a predetermined optical camera parameter and the lens distortion for considering a viewing angle in 3D space for each image pixel when predicting the at least one characteristic, and/or encode the camera rotation for considering the camera rotation with respect to the reference frame when predicting the at least one characteristic.

The predetermined optical camera parameter may comprise at least one of a camera resolution and a focal length of the camera.

The first static feature map may comprise for each image pixel or for a group of neighboring image pixels a 3D normal vector representing the viewing angle and/or the camera rotation.

The architecture of the neural network may further comprise at least one second static feature map configured to encode the camera translation for considering the camera translation with respect to the reference frame when predicting the at least one characteristic.

The architecture of the neural network may further comprise a third feature map configured to encode depth information for each pixel. Said depth information represents e.g. the distance between the camera and the scene of the image.

The reference frame may be defined as an external reference frame external to the system and/or the camera, the external reference frame being in particular in a pre-defined position and orientation with regard to the system and/or the camera.

Alternatively the reference frame may be defined based on a pose of another camera of the system.

The at least one static feature map may be predefined and/or configured to remain unchanged during neural network training.

The neural network may comprise a predefined number of layers, each layer comprising at least one channel, wherein the at least one static feature map may be added in addition to a predefined channel in at least one layer or replacing the predefined channel.

The system may further comprise one or a plurality of digital cameras, and/or a data storage to store the trained neural network, and/or a processor to process the image using the neural network.

The present disclosure further relates to a computer implemented method for processing an image of at least one camera, the camera having predetermined camera parameters including a lens distortion and a camera pose with respect to a predefined reference frame, the method comprising steps of: inputting the image to a trained neural network, which receives the image of the camera as input and predicts in response at least one characteristic, wherein an architecture of the neural network comprises at least one static feature map which encodes the predetermined camera parameters including the lens distortion and/or the camera pose.

The method may comprise further steps or characteristics corresponding to the functions or features of the system described above.

The present disclosure further relates to a computer implemented method for training a neural network for processing an image of a camera, the method comprising steps of:
  providing the neural network with a predefined architecture, the neural network being configured to receive the image of the camera as input and to predict in response at least one characteristic,
  providing a training set of training images of one or a plurality of cameras for training the neural network,
  providing at least one static feature map for the camera for training the neural network or, in case of the plurality of cameras, at least one static feature map for each camera, respectively,
  training the neural network based on the training images by using for each training image the static feature map.

The at least one static feature map may be configured to encode predetermined camera parameters including a lens distortion and/or a camera pose with respect to a pre-defined reference frame of the respective camera.

The present disclosure further relates to a recording medium readable by a computer and having recorded thereon a computer program including instructions for executing the steps of the method according to any one of the preceding methods.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the disclosure and together with the description, and serve to explain the principles thereof.

FIG. 1 shows a block diagram of a system according to embodiments of the present disclosure;

FIG. 2 shows a schematic overview of the information that can be encoded into the static feature map(s) according to embodiments of the present disclosure;

FIG. 3 shows an exemplary camera reference frame in a 3D coordination system according to embodiments of the present disclosure;

FIG. 4 shows an exemplary pinhole camera model showing the relation between world coordinates and camera coordinates according to embodiments of the present disclosure, and FIG. 5 shows an example of neural network layers with static feature maps according to embodiments of the present disclosure.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

FIG. 1 shows a block diagram of a system 10 according to embodiments of the present disclosure. The system is configured to carry out the method according the present disclosure. In particular, the system may be configured to carry out computer instructions, e.g. as given by a trained neural network.

For example the system may comprise a processor 11 (e.g. at least one CPU and/or GPU) and a memory 13 for executing said instructions. The memory 13 may be a non-volatile memory and it may comprise said instructions (i.e. the trained neural network and/or a computer program), e.g. of the method according the present disclosure. Said method can be executed by the processor 11 for processing an image (e.g. for semantic segmentation or any other image processing task). In particular, the memory may store a trained artificial neural network (ANN), which can be executed by the processor 11 to perform the method described below.

The system 10 may further comprise and/or be connected to an acquisition module 12 configured to acquire images (e.g. one or several cameras, in particular only monocular camera(s) for obtaining monocular surround view images of the environment of the system). For example, the system may comprise a plurality of cameras which together obtain a panoramic (e.g. 360°) image of the system environment, in particular without any depth information. Alternatively it may comprise only one rotating camera.

The acquisition module 12 (i.e. the camera(s)) has predetermined camera parameters including a lens distortion and a specific camera pose with respect to the system and with respect to a predefined reference frame (e.g. given by the system or any other external object).

The trained neural network, e.g. being a Convolutional Neural Network (CNN), has a predefined architecture and is configured to receive the image of the acquisition module as input and to predict in response at least one characteristic (e.g. semantic image segments).

Furthermore the architecture of the neural network comprises at least one static feature map configured to encode the predetermined camera parameters including the lens distortion and/or the camera pose. Said static feature map(s) will be described in more detail in the following in context of FIGS. 2 to 4.

The system may be part of a robotic system or a vehicle 30. In other words, the system, in particular its acquisition module 12 may be configured to autonomously move. In this scenario, when the system comprises a plurality of cameras, it is desired to "calibrate" their produced images to each other. In this scenario, the reference frame is desirably defined based on the pose of another camera of the system. For example, a single neural network can be trained for all camera viewpoints, by inserting their respective global pose parameters as additional channels.

Alternatively, the reference frame may be defined as a reference frame external to the system and/or the camera. Said external reference frame may be in particular in a pre-defined position and orientation with regard to the system and/or the camera. For example, the camera may have a locally fixed position (e.g. on a tower or otherwise in a predetermined height with regard to the ground level) and reference frame may be defined by the ground plane. Accordingly, the static feature map (i.e. global pose feature maps) may also be used to encode the known camera position with respect to a relevant global reference frame (e.g. the ground plane).

FIG. 2 shows a schematic overview of the information that can be encoded into the static feature map(s) according to embodiments of the present disclosure.

As shown in FIG. 2, it is proposed to explicitly encoding spatial information into the neural network. This is done by adding static features maps encoding the camera intrinsic parameters and viewpoint. In this context 'static' is used to indicate they are fixed parameters, not affected by (re) training the network. A general overview of the system is shown in FIG. 2. The intrinsic parameters are represented by maps containing each pixels' viewing angle with respect to the camera viewing direction.

FIG. 3 shows an exemplary camera reference frame in a 3D coordination system according to embodiments of the present disclosure.

Every camera reference frame XYZ can be transformed to a global reference X'Y'Z' using a rigid transform $P_i$. Here, it is referred to the pose of camera i with respect to a chosen global reference frame as $P_i=[R_i \ t_i]$ with $R_i \in SO(3)$ the rotation component and $t_i \in \mathbb{R}^3$ the translation component (meaning $P_i$ is a general rigid transformation). Such a pose/transform is illustrated in FIG. 2.

Camera Model

It is proposed to introduce a standard camera model (for clarity and to introduce symbols and notation). The parameters in this camera model will be used to generate the proposed fixed feature maps.

$$K = \begin{bmatrix} f_x & s & c_x(1) \\ 0 & f_y & c_y(2) \\ 0 & 0 & 1 \end{bmatrix} \quad (1)$$

In this context FIG. 4 shows an exemplary pinhole camera model showing the relation between world coordinates and camera coordinates according to embodiments of the present disclosure.

Calibration matrix K with focal lengths $f_x$ and $f_y$, s the skew factor between the sensor axes, and $(c_x, c_y)$ the camera optical center (in pixel coordinates), cf. also FIG. 4.

$$P = \begin{bmatrix} K & 0(4) \\ 0^T & 1 \end{bmatrix} \begin{bmatrix} R & t(5) \\ 0^T & 1 \end{bmatrix} \quad (2)$$

Camera matrix P containing both the intrinsic camera parameters from the calibration matrix K and the extrinsic parameters: the euclidean, rigid body transformation [R t].

Camera matrix P allows to map 3D world coordinates $p_w=(x_w,y_w,z_w,1)$ to image coordinates $p_i=(x_i,y_i,1, d)$.

$$p_i = PP_w \quad (3)$$

For every pixel in the image space (u,v) desirably also the lens distortion should be take into account:

$$\begin{cases} x' = \dfrac{u - c_x}{f_x}(8) \\ y' = \dfrac{v - c_y}{f_y} \end{cases} \quad (4)$$

$$\begin{cases} x'' = x'\dfrac{1+k_1 r^2 + k_2 r^4 + k_3 r^6}{1+k_4 r^2 + k_5 r^4 + k_6 r^6} + 2p_1 x'y' + p_2(r^2 + 2x'^2)(10) \\ y'' = y'\dfrac{1+k_1 r^2 + k_2 r^4 + k_3 r^6}{1+k_4 r^2 + k_5 r^4 + k_6 r^6} + p_1(r^2 + 2y'^2) + 2p_2 x'y' \end{cases} \quad (5)$$

with $r^2 = x'^2 \ y'^2$, $p_1$ and $p_2$ the tangential distortion parameters and $k_1$, $k_2$, $k_3$, $k_4$, $k_5$, $k_6$ the radial distortion coefficients.

Pixel Viewing Angles

From the camera calibration data all pixels may be mapped back to 3D viewing angle vectors. This requires inverting the above mapping (now going from distorted camera coordinates to undistorted viewing vectors).

$$x'' \leftarrow (u - c_x)/f_x \quad (6)$$

$$y'' \leftarrow (v - c_y)/f_y$$

$$(x', y') = \text{undistort}(x'', y'', \text{distCoeffs})$$

$$[xyz]^T \leftarrow R * [x' y' 1]^T$$

$$[xyz]^T \leftarrow [xyz]^T / \|xyz\|$$

with undistort an approximate iterative algorithm estimating the normalized original point coordinates from the normalized distorted point coordinates (cf. e.g. Mallon, J., Whelan, P. F.: Precise radial un-distortion of images. In: Proceedings of the 17th International Conference on Pattern Recognition, 2004. ICPR 2004. Volume 1., IEEE (2004) 18-21) and distCoeffs the distortion parameters, (and as above (u,v) the image space pixel coordinates, R the camera rotation with respect to the global reference frame).

While in this example the viewing angle is presented using 3D normalized vectors, also other representations could be used (e.g. Euler Angles, quaternions, axis—angle representation, . . . ).

Concatenating Fixed Feature Maps

These per pixel viewing angles (represented by 3D unit vectors) may be added (e.g. concatenated along the channels dimension) into the neural network architecture as fixed feature map channels (note that they can be re-sampled for layers having dimensions different from the original image resolution). See FIG. 5 for an example, which shows neural network layers with static feature maps according to embodiments of the present disclosure.

For any layer L in the network, the proposed static global pose feature maps may be added, in addition to (or replacing some of) the existing, dynamic channels. These channels allow the L+1 layer to use the encoded global pose information. The information may be (implicitly) available to any L+x layer.

Any (combination) of the following additional fixed feature maps can be used:
  Local per pixel viewing angles (from camera calibration matrix K and the distortion parameters)
  Global per pixel viewing angles (from camera calibration matrix K+camera relative rotation matrix R)
  Relative camera 3D location (X,Y,Z), represented by camera relative translation vector t
  Estimate of background scene depth (e.g. obtained from a LIDAR scan and motion based background segmentation), represented, for example, by the distance between the camera center and the scene background.

For camera calibration purposes both the intrinsic and extrinsic parameters discussed in the section above regarding concatenating fixed feature maps can be obtained using standard computer vision camera calibration techniques.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

What is claimed is:

1. A system for processing an image of at least one camera, the camera having predetermined camera parameters including a lens distortion and a camera pose with respect to a predefined reference frame, the system comprising:

a trained neural network with a predefined architecture, the neural network being configured to receive the image of the camera as input and to predict in response at least one characteristic, wherein the architecture of the neural network comprises at least one static feature map configured to encode the predetermined camera parameters including the lens distortion and/or the camera pose;

wherein the camera pose is defined by camera rotation and/or camera translation with respect to the reference frame, and/or the predetermined camera parameters comprise optical camera parameters, and/or the camera comprises a lens which defines the lens distortion.

2. The system according to claim 1, wherein the architecture of the neural network comprises at least one first static feature map configured to:

encode a predetermined optical camera parameter and the lens distortion for considering a viewing angle in 3D space for each image pixel when predicting the at least one characteristic, and/or encode the camera rotation for considering the camera rotation with respect to the reference frame when predicting the at least one characteristic.

3. The system according to claim 2, wherein the predetermined optical camera parameter comprises at least one of a camera resolution and a focal length of the camera.

4. The system according to claim 2, wherein the first static feature map comprises for each image pixel or for a group of neighboring image pixels a 3D normal vector representing the viewing angle and/or the camera rotation.

5. The system according to claim 1, wherein the architecture of the neural network further comprises at least one second static feature map configured to encode the camera translation for considering the camera translation with respect to the reference frame when predicting the at least one characteristic.

6. The system according to claim 1, wherein the architecture of the neural network further comprises a third feature map configured to encode depth information for each pixel.

7. The system according to claim 1, wherein the reference frame is defined as an external reference frame external to the system and/or the camera, the external reference frame being in particular in a predefined position and orientation with regard to the system and/or the camera, or the reference frame is defined based on a pose of another camera of the system.

8. The system according to claim 1, wherein the at least one static feature map is predefined and/or configured to remain unchanged during neural network training.

9. The system according to claim 1, wherein the neural network comprises a predefined number of layers, each layer comprising at least one channel, wherein the at least one static feature map is added in addition to a predefined channel in at least one layer or replacing the predefined channel.

10. The system according to claim 9,
further comprising one or a plurality of digital cameras, and/or
a data storage to store the trained neural network, and/or
a processor to process the image using the neural network.

11. A computer implemented method for training a neural network for processing an image of a camera, the method comprising steps of:
providing the neural network with a predefined architecture, the neural network being configured to receive the image of the camera as input and to predict in response at least one characteristic,
providing a training set of training images of one or a plurality of cameras for training the neural network,
providing at least one static feature map for the camera for training the neural network or, in case of the plurality of cameras, at least one static feature map for each camera, respectively,
training the neural network based on the training images by using for each training image the static feature map;
wherein the at least one static feature map is configured to encode predetermined camera parameters including a lens distortion and/or a camera pose with respect to a pre-defined reference frame of the respective camera.

* * * * *